United States Patent
Chatterjee

(10) Patent No.: US 6,660,072 B2
(45) Date of Patent: Dec. 9, 2003

(54) REDUCED-CORROSION INKJET INKS AND METHODS FOR MAKING SAME

(75) Inventor: Amiya K Chatterjee, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 67 days.

(21) Appl. No.: 10/028,197

(22) Filed: Dec. 21, 2001

(65) Prior Publication Data

US 2003/0116060 A1 Jun. 26, 2003

(51) Int. Cl.[7] ............................................. C09D 11/02
(52) U.S. Cl. ................. 106/31.58; 106/31.43; 106/31.75; 106/31.86
(58) Field of Search .................... 106/31.58, 31.43, 106/31.75, 31.86

(56) References Cited

U.S. PATENT DOCUMENTS

| | | | |
|---|---|---|---|
| 3,816,322 A | 6/1974 | Griffin et al. | 510/259 |
| 4,557,838 A | 12/1985 | Nichols et al. | 507/242 |
| 5,084,210 A | 1/1992 | Teeters | 252/392 |
| 5,102,458 A | 4/1992 | Lent et al. | 106/31.43 |
| 5,196,057 A * | 3/1993 | Escano et al. | 106/31.59 |
| 5,256,192 A | 10/1993 | Liu et al. | 106/31.15 |
| 5,257,042 A | 10/1993 | Buhler | 347/64 |
| 5,385,957 A | 1/1995 | Tobias et al. | 523/161 |
| 5,498,283 A * | 3/1996 | Botros et al. | 106/31.43 |
| 5,574,078 A | 11/1996 | Elwakil | 523/161 |
| 5,624,485 A * | 4/1997 | Calhoun | 524/386 |
| 5,709,737 A | 1/1998 | Malhotra et al. | |
| 5,985,169 A | 11/1999 | Miller et al. | 252/188.28 |
| 5,990,197 A | 11/1999 | Escano et al. | 523/160 |
| 5,993,688 A | 11/1999 | Blinka et al. | 252/188.28 |
| 6,007,610 A | 12/1999 | Matzinger et al. | 106/14.05 |
| 6,007,885 A | 12/1999 | Hallock | 428/35.7 |
| 6,071,334 A | 6/2000 | Wider et al. | 106/31.58 |
| 6,076,912 A | 6/2000 | Murthy | 347/18 |
| 6,086,786 A | 7/2000 | Blinka et al. | 252/188.28 |
| 6,102,521 A | 8/2000 | Halko et al. | 347/47 |
| 6,284,153 B1 | 9/2001 | Miller et al. | 252/188.28 |
| 2002/0112643 A1 * | 8/2002 | Tyvoll et al. | 106/31.47 |

FOREIGN PATENT DOCUMENTS

| | | |
|---|---|---|
| EP | 1122286 | 8/2001 |
| EP | 1142967 | 10/2001 |
| EP | 1148103 | 10/2001 |

* cited by examiner

*Primary Examiner*—Helene Klemanski

(57) ABSTRACT

Improved inkjet ink compositions have a sufficient amount of an acetylenic alcohol incorporated therein to reduce the corrosiveness of the ink without adversely affecting the printing characteristics of the ink composition. The inkjet ink compositions of the invention include a carrier, a colorant that is soluble or dispersable in said carrier, and a sufficient quantity of at least one acetylenic alcohol to reduce the corrosiveness of said ink composition to metal placed in contact with said ink composition. The inkjet ink compositions may also include at least one acetylenic alcohol that contains a terminal acetylene and an α-hydroxy group. A method for reducing corrosiveness of an inkjet ink composition includes adding to said inkjet ink composition a sufficient quantity of at least one acetylenic alcohol to reduce the corrosiveness of said ink composition to metal placed in contact with said ink composition.

13 Claims, 1 Drawing Sheet

REDUCED-CORROSION INKJET INKS AND METHODS FOR MAKING SAME

FIELD OF THE INVENTION

The present invention generally relates to corrosion inhibitors and, more particularly, to inkjet printing formulations which contain corrosion inhibitors and methods of making the same.

BACKGROUND OF THE INVENTION

Inkjet printing is a nonimpact printing process in which droplets of ink are deposited on a print medium. Substantial developments have been made in the field of electronic printing technology, leading to the existence of a wide variety of highly efficient printing systems that are capable of dispensing ink in a rapid and accurate manner. One such system is a thermal inkjet printer that utilizes ink cartridges. Thermal inkjet print cartridges operate by rapidly heating a small volume of ink to cause the ink to vaporize and be ejected through one of a plurality of orifices so as to print a dot of ink on a recording medium, such as a sheet of paper. Typically, the orifices are arranged in one or more linear arrays in a nozzle plate. The properly sequenced ejection of ink from each orifice causes characters or other images to be printed upon the paper as the printhead is moved across the paper.

These and other inkjet printing techniques typically impose rigid requirements on the ink compositions. To be suitable for use as a jet ink, the compositions must meet particular requirements. In general, a successful ink set for color inkjet printing should have good crusting resistance, good stability, proper viscosity, proper surface tension, good color-to-color bleed alleviation, rapid dry time, no negative reaction with the vehicle, consumer-safety, good permanence (e.g., smearfastness, lighffastness, waterfastness), and low strike-through. Further, the ink must be quick drying and smear resistant and capable of passing through the inkjet nozzle without clogging. The ink should also permit rapid cleanup of the machine components with minimum effort. When placed into a thermal inkjet system, the ink set should also be kogation resistant and have stable drop ejection performance (e.g. little or no drop velocity degradation over time).

Corrosion of metal parts is a problem presented in many industrial fields, including the field of inkjet printing. Difficulties have been encountered in the development of inkjet printing formulations which do not cause or promote undue corrosion of metal parts of the inkjet printing apparatus that come into contact with the printing ink. Although ink compositions are required to have certain characteristics, few ink compositions possess all the aforementioned properties, since an improvement in one property often results in the degradation of another property. Thus, many inks commercially used represent a compromise in an attempt to achieve an ink evidencing at least an adequate response in each of the performance attributes, such as waterfastness and optical density. One such compromise has resulted in the addition of acids to provide particular attributes to the ink composition, such as bleed control. However, the addition of acid to these inks, along with other ink components, such as surfactants, colorants, and electrolytes, render the inks corrosive towards steel.

In response to this problem, substantial time and effort has been expended formulating specific inkjet formulations that are acceptable from the standpoint of minimizing metal corrosion. Thus, a need exists for corrosion inhibitors that can be incorporated into inkjet formulations to reduce corrosion of metal parts which come into contact with the inkjet formulations. Such inhibitors at the same time should not adversely affect the previously described, desirable properties of the ink compositions.

For general applications in fields not requiring such stringent control of physicochemical parameters, many compositions, including acetylenic alcohols and derivatives thereof, have been employed as corrosion inhibitors. For example, U.S. Pat. No. 5,084,210 describes a corrosion inhibitor containing an acetylenic alcohol that is used in connection with a chlorine dioxide process for controlling biomass and cleaning water injection wells and oil producing wells. U.S. Pat. No. 4,557,838 describes inhibition of metal corrosion caused by aqueous acid solutions by admixing a synergistic additive consisting of a heterocyclic nitrogen compound or alkylamine with an acetylenic alcohol and dialkythiourea to the aqueous acid solution. U.S. Pat. No. 3,816,322 describes dispersing a compound containing a heterocyclic amine, an acetylenic alcohol, and an ionizable iodine containing compound into an aqueous acidic solution containing a polyhydric compound in order to protect iron surfaces against corrosion by the aqueous acidic solution. U.S. Pat. Nos. 6,284,153; 6,086,786; 6,007,885; 5,993,688; and 5,985,169 describe oxygen-scavenging compositions containing alkyl alcohols for inhibition of corrosion in metal storage containers.

Despite all of the foregoing uses of a variety of alcohols, in corrosion inhibiting formulations, either directly, or as salts, derivatives, or complexes, use of acetylenic alcohols in inkjet formulations to inhibit or eliminate corrosion of metal inkjet printer parts that come in contact with such inkjet formulations have not been disclosed. In view of the shortcomings in the art, there is a need for inkjet ink compositions including corrosion inhibitors and methods of reducing or eliminating metal corrosiveness of inkjet ink compositions.

BRIEF SUMMARY OF THE INVENTION

In accordance with the present invention, acetylinic alcohols are incorporated into inkjet printing formulations at a level sufficient to inhibit corrosion of metal (e.g., steel) placed in contact with the ink formulation, while having essentially no effect upon the physicochemical properties of the inkjet formulation. The ability to add such acetylenic alcohols in sufficient quantity to inhibit corrosion, while not significantly affecting the physicochemical properties of the inkjet formulation permits previously formulated jet ink compositions to be rendered corrosion resistant, without requiring complete reformulation of the ink composition.

The present invention additionally provides improved inkjet ink compositions having a sufficient amount of an acetylenic alcohol incorporated therein to reduce the corrosiveness of the ink without adversely affecting the printing characteristics of the ink composition.

The inkjet ink compositions of the invention include a carrier, a colorant that is soluble or dispersable in said carrier, and a sufficient quantity of at least one acetylenic alcohol to reduce the corrosiveness of said ink composition to metal placed in contact with said ink composition. In a particular embodiment of the invention, the inkjet composition includes at least one acetylenic alcohol that contains a terminal acetylene and an α-hydroxy group. In yet another embodiment, the acetylenic alcohol is preferably selected from the group consisting of propargyl alcohol, methyl butynol, 3,5-dimethyl-1-hexyne-3-ol, 1-hexyne-3-ol, 5-methyl-1-hexyne-3-ol, 1-octyn-3-ol 1-phenyl-2-propyn-1-ol, 1-ethynyl-cyclopentan-1-ol, and 1-ethynyl-cyclohexan-1-ol. The acetylenic alcohol preferably comprises from about 500 ppm to about 0.5% total weight of said ink composition. A method for reducing corrosiveness of an inkjet ink composition includes adding to said inkjet ink composition a sufficient quantity of at least one acetylenic alcohol, as previously described, to reduce the corrosiveness of said ink composition to metal placed in contact with said ink composition.

BRIEF DESCRIPTION OF THE SEVERAL VIEWS OF THE DRAWINGS

While the specification concludes with claims particularly pointing out and distinctly claiming that which is regarded as the present invention, the present invention can be more readily ascertained from the following description of the invention when read in conjunction with the accompanying drawings in which

DETAILED DESCRIPTION OF THE INVENTION

Figure 1:
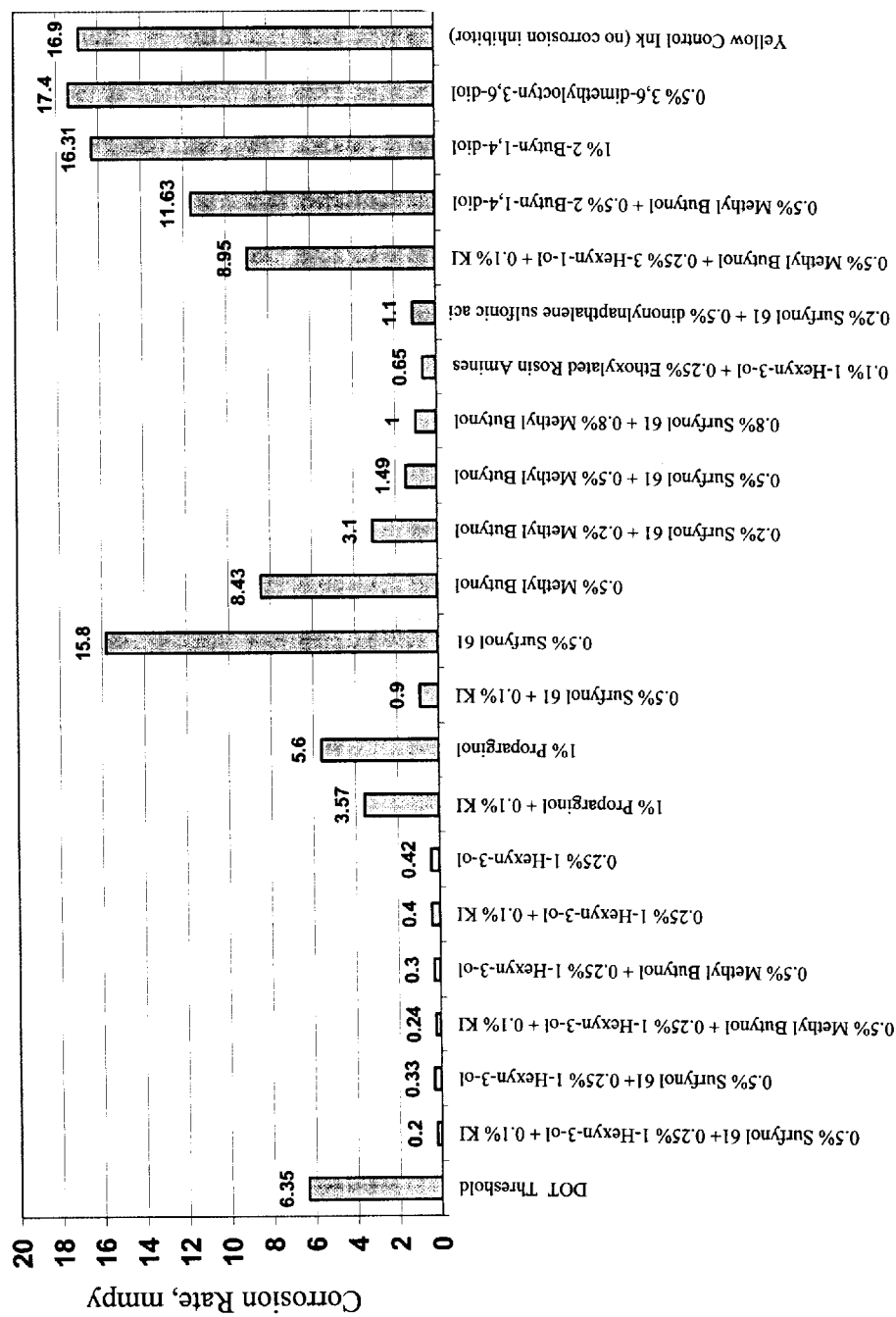
FIG. 1 is a graph of results illustrating the corrosion performance of several acetylenic alcohol inhibitor formulations.

The present invention provides inkjet ink formulations that have a decreased tendency to corrode metal that comes into contact with the inkjet ink formulations. Through use of the acetylenic alcohol corrosion inhibitors of the present invention, the beneficial properties of the inkjet ink formulation, such as adhesion and drying time of the ink, are preserved. Additionally, the corrosion inhibitors of the present invention do not destabilize the ink, as they do not substantially affect the critical physicochemical properties of the inkjet formulation.

Through use of acetylenic alcohol corrosion inhibitors, a normally corrosive inkjet ink formulation may be rendered less corrosive or substantially noncorrosive, by adding thereto an effective amount of at least one acetylenic alcohol. In a preferred embodiment of the invention, at least one acetylenic alcohol that contains a terminal acetylene and an α-hydroxy group, such as, for example, propargyl alcohol, methyl butynol, 3,5-dimethyl-1-hexyne-3-ol, 1-hexyne-3-ol, 5-methyl-1-hexyne-3-ol, 1-octyn-3-ol, 1-phenyl-2-propyn-1-ol, 1-ethynyl-cyclopentan-1-ol, and 1-ethynyl-cyclohexan-1-ol, or mixtures thereof. By incorporating acetylenic alcohol corrosion inhibitors into the inkjet ink formulations, corrosion of the metal parts of an inkjet printing apparatus that are typically susceptible to corrosion, such as that due to exposure to acids from components of the inkjet ink formulation, is reduced or eliminated. Typically, the amount of acetylenic alcohol present in the ink formulation will be from about 500 parts per million (ppm) to about 0.5 weight percent (wt %), based upon the total weight of the ink formulation. In one particular embodiment, the acetylenic alcohol includes 3,5-dimethyl-1-hexyne-3-ol in combination with at least one corrosion inhibitor selected from the group consisting of sulfonic acid, amines, potassium iodide, and an acetylenic alcohol other than 3,5-dimethyl-1-hexyne-3-ol. In yet another embodiment of the invention, the acetylenic alcohol includes methyl butynol in combination with at least one corrosion inhibitor selected from the group consisting of sulfonic acid, amines, potassium iodide, and an acetylenic alcohol other than methyl butynol.

The inks of the present invention comprise an aqueous vehicle which can include one or more of the following components (in wt % of total ink composition): from about 5 to about 20 wt % of at least one colorant (e.g., black, magenta, cyan, and/or yellow dye(s) or pigment(s)); from about 0.05 wt % (500 ppm) to about 0.5 wt % of at least one acetylenic alcohol corrosion inhibitor; from about 5 to about 20 wt % of at least one water soluble organic solvent; 0 to about 5 wt % of a bleed control agent containing an acid, such as a carboxylic organic acid (e.g., succinic acid); and 0 to about 1.5 wt % of at least one component independently selected from the group consisting of surfactants, buffers, biocides, and metal chelators; and the balance water. The inks of the present invention may also include additives, such as amines, potassium iodide, or sulfonic acid.

Typically the colorant will be a dye or a pigment. Suitable colorants include carbon black and dye-stuff components that are soluble or dispersable in the solvent. One skilled in the art will be able to ascertain other such operable dyes through reference to information as contained in the Color Index Guide. The amount of colorant employed in the practice of the invention is not critical and can be varied within relatively broad ranges.

The water soluble organic solvents suitably employed in the present inkjet ink compositions include any of, or a mixture of two or more, of such compounds as nitrogen-containing heterocyclic ketones, diols, glycols and thioglycols, and glycol ethers. Suitable surfactants for use with the invention include nonionic surfactants, such as secondary alcohol ethoxylates, nonionic fluoro surfactants, nonionic fatty acid ethoxylate surfactants, nonionic silicone surfactants, and fatty amide ethoxylate surfactants. Buffers employed in the practice of the invention to modulate pH can be organic-based biological buffers or inorganic buffers, preferably, organic-based. Further, the bleed control agent(s) and buffer(s) employed should maintain a pH ranging from about 3.5 to about 5, and preferably have a pH of about 4. Examples of preferred buffers include Trizma Base, available from companies such as Aldrich Chemical (Milwaukee, Wis.), 4-morpholineethanesulfonic acid (MES), b-hydroxy-4-morpholinepropanesulfonic acid (MOPSO), and 4-morpholinepropanesulfonic acid (MOPS). Examples of suitable metal chelators for use with the present invention include ethylenediaminetetraacetic acid (EDTA), diethylentriaminepentaacetic acid (DTPA), trans-1,2-diaminocyclohexanetetraacetic acid (CDTA), (ethylenedioxy) diethylenedinitrilotetraacetic acid (EGTA), or any other chelators that can bind transition metal actions. Any of the biocides commonly employed in inkjet inks may be employed in the practice of the invention, such as, for example, Nuosept 95, available from Huls America (Piscataway, N.J.); Proxel GXL, available from Zeneca (Wilmington, Del.); and glutaraldehyde, available from Union Carbide Company (Bound Brook, N.J.) under the trade designation Ucarcide 250. Proxel GXL is the preferred biocide.

It also may be desirable to add humectants, such as ethylene glycol or propylene glycol methyl ether, to prevent the inkjet tip from drying. Small amounts of organic cosolvents may also be added to improve drying time and reduce surface tension. Suitable cosolvents include n-methyl-2-pyrrolidone and butanol. Other conventional components may also be employed in the inkjet ink compositions.

The following compounds are representative compounds illustrating the main types of acetylenic alcohol corrosion inhibitors tested:

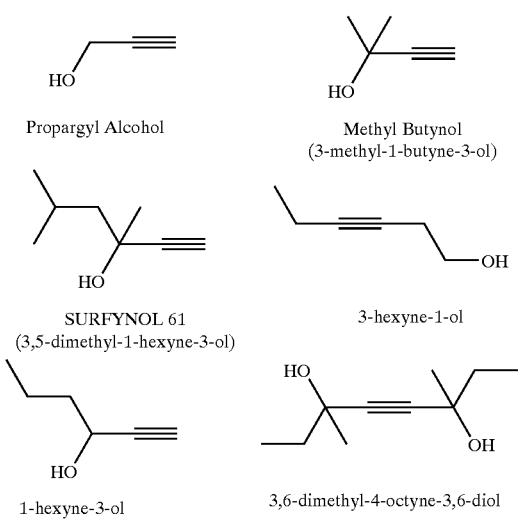

Based on the structures of the tested compounds, it was expected that the presence of a terminal acetylenic group next to an α-hydroxy function would yield improved corrosion inhibiting effects on inkjet ink compositions based on the existence of keto-enol tautomerism shown by the following formula:

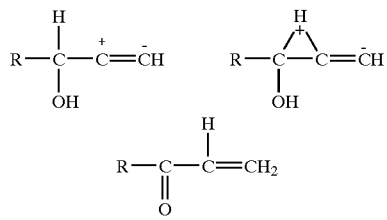

Of the aforementioned compounds, propargyl alcohol is the simplest acetylenic alcohol satisfying this requirement. It is thought that the polarization of the triple bond is first stabilized by a nonclassical carbonium ion and further by a α-keto-double bond configuration, which is known to complex strongly with transition metal ions. For maximum corrosion inhibition, the hydroxyl group should be located not only in α-position but also on a secondary carbon atom. Thus, propargyl alcohol is expected to be a more effective inhibitor than either methyl butynol or 3,5-dimethyl-1-hexyne-3-ol. Based on this model, longer chain substitution of the α-hydrogen are also thought to improve corrosion inhibition, and are thus preferred. Thus, 1-hexyne-3-ol is more effective than propargyl alcohol. Compounds with nonterminal acetylenic groups, such as 3-hexyne-1-ol or acetylenic diols are less effective when used as sole agents because of a steric hindrance effect.

EXAMPLES

Example I

The rate of corrosion for ink formulations containing various corrosion inhibition formulations was determined by a procedure similar to that recommended by the US Department of Transportation (DOT) to test the effect of corrosive inhibitors on metals. Circular steel coupons measuring 1.5 inches in diameter and having a thickness of ⅛ of an inch were immersed into the candidate ink formulations containing various corrosion inhibitor formulations. More specifically, three coupons were used for each ink formulation being tested and the coupons were hung with thread into one liter of ink in a closed container that was kept at 55° C. in an oven for 24 hours. The corrosion rate was determined gravimetrically from the amount of weight loss in relation to the total surface area of the coupons exposed to the ink. This result was expressed as millimeter per year (mmpy). Good cleaning of the coupons before and after immersing into ink was performed to assure that good reproducibility was obtained and an average rate based on three tested coupons was reported.

Referring to FIG. 1, the corrosion performance of several corrosion inhibitor formulations is shown. The Department of Transportation (DOT) corrosion rate requirement is shown as the first bar on the extreme left as a reference point. Ink compositions having corrosion rates equal to or less than the DOT corrosion rate requirement (i.e., mmpy equal to or less than 6.35) are considered to be noncorrosive and nonhazardous. A control inkjet ink sample having no corrosion inhibitor is shown as the last bar on the extreme right as a secondary reference point. Following the DOT rate are the corrosion test results of six formulations containing 1-hexyne-3-ol, either alone or in combination with other acetylenics, with and without KI. As illustrated in FIG. 1, these corrosion inhibitor formulations demonstrated the best corrosion inhibition of the group of tested formulations. Also shown are results for propargyl alcohol and SURFYNOL-61 (3,5-dimethyl-1-hexyne-3-ol), with and without KI. In all cases KI seemed to have a positive (catalytic) effect, which was very pronounced in case of the sample containing SURFYNOL-61 as a corrosion inhibitor. The two diols (1% 2-butyn-1,4-diol and 0.5% 3,6-dimethyloctyn-3,6-diol) were comparatively the worst performers when used as sole agents. Interestingly, although SURFYNOL-61 and methyl butynol did not demonstrate high corrosion inhibition when used as sole agents, the various blends were very effective inhibitors, indicating some structural synergism between the same. The importance of the terminal location of the acetylenic group is demonstrated by the results of 1-hexyne-3-ol and 3-hexyne-1-ol ($2^{nd}$ bar and $18^{th}$ bar in FIG. 1), obtained at comparable conditions. The acetylenic alcohols, when combined with commercial inhibitors, such as rosin amines and alkyl sulfonic acids, provided excellent corrosion inhibition, as illustrated in the $16^{th}$ and $17^{th}$ bars of FIG. 1.

Example II

Several other acetylenic alcohols were tested for corrosion inhibition according to the method described in Example I. The additional acetylenic alcohol candidates contained a terminal acetylene and an alpha-hydroxy group, and included a variety of hydrophobic chain lengths and branching configurations, including cyclic and aromatic substitutions. The tested acetylenic alcohols included 5-methyl-1-hexyne-3-ol, 1-octyn-3-ol, 1-phenyl-2-propyn-1-ol, 1-ethynyl-cyclopentan-1-ol, and 1-ethynyl-cyclohexan-1-ol. The tested acetylenic alcohol inhibitors exhibited excellent performance, providing a cumulative corrosion rate ranging between 0.2 to 4.1 mmpy.

Although not wishing to be bound by any particular theory relating to a mechanism of action, the mechanism for inhibition of corrosion with acetylenic alcohols involves two steps. First, the inhibitors are chemisorbed on the metal surface primarily through the strong interactions between the π-electrons of the acetylene groups and the d-orbital electrons of iron. The strength of the π-d-interactions depends upon the availability of the π-electrons, which is determined by the location of the acetylenic group and the nature of the substitutions around it. Second, polymerization of the adsorbed inhibitors in layers occurs by either H-bonding and/or complex formation with the metal ions. The α-hydroxy groups also play a key role in enhancing corrosion inhibition. In acidic environments the α-hydroxy groups are easily protonated, and the protonated alkynols can interact among themselves through H-bonding and with the metal surface forming a complex inhibitor multilayer. Such a charged molecular barrier is analogous to a three-dimensional polymer, which prevents the metal from further corrosion by repelling away the protons from near the surface. This or similar mechanism also explain the excellent corrosion inhibition of iron demonstrated by inhibitor formulations containing 1-hexyne-3-ol and/or methyl butynol.

IR studies indicate that such films could be up to 200 Angstroms thick and can comprise as many as 50 molecular layers. The triple bond can also function as a Bronsted base in H-bonding with OH and protonated OH groups.

A second possible way for barrier film formation is through complexation of the α-keto inhibitor tautomers with the ferrous ions, which results in a three-dimensional network. This model, unlike the previously described multilayer model, can explain the inhibitor's interference with the surface kinetics, as well as the charge transfer processes across the boundary layer. Adsorption isotherm studies indicated that an inhibitor does not necessarily block both anodic and cathodic reaction sites. Also, even at saturation coverage, the inhibitor does not necessarily block all surface sites. It is thought that the barrier film is primarily a three-dimensional chelate made up of iron ions and inhibitor molecules. The corrosion rate is then controlled by the thickness of this layer, which, in turn is dependent on the formation rate of the chelate, as well as its dissociation rate.

When the inkjet ink compositions of the present invention are placed into contact with steel plates and printer parts, substantially no corrosion results whereas an otherwise identical composition, but not containing the acetylenic alcohol corrosion inhibitor(s), causes deep pits and significant degradation of the steel to occur.

Having thus described certain preferred embodiments of the present invention, it is to be understood that the invention defined by the appended claims is not to be limited by particular details set forth in the above description, as many apparent variations thereof are possible without departing from the spirit or scope thereof as hereinafter claimed.

What is claimed is:

1. An inkjet ink composition having reduced corrosiveness to metal comprising a carrier, a colorant that is soluble or dispersable in said carrier, and a sufficient quantity of at least one acetylenic alcohol to reduce the corrosiveness of said ink composition to metal placed in contact with said ink composition, wherein said at least one acetylenic alcohol contains a terminal acetylene and an α-hydroxy group.

2. The inkjet ink composition of claim 1, wherein said at least one acetylenic alcohol comprises an acetylenic diol in combination with an acetylenic alcohol that contains a terminal acetylene and an α-hydroxy group.

3. The inkjet ink composition of claim 1, wherein said at least one acetylenic alcohol provides a rate of corrosion equal to or less than 6.35 millimeters per year in steel coming in contact with said inkjet composition.

4. The inkjet ink composition of claim 1, further comprising an additive selected from the group consisting of amines, potassium iodide, and sulfonic acid.

5. The inkjet ink composition of claim 1, wherein said at least one acetylenic alcohol comprises 3,5-dimethyl-1-hexyne-3-ol in combination with at least one corrosion inhibitor selected from the group consisting of sulfonic acid, amines, potassium iodide, and an acetylenic alcohol other than 3,5-dimethyl-1-hexyne-3-ol.

6. The inkjet ink composition of claim 1, wherein said at least one acetylenic alcohol comprises methyl butynol in combination with at least one corrosion inhibitor selected from the group consisting of sulfonic acid, amines, potassium iodide, and an acetylinic alcohol other than methyl butynol.

7. The inkjet ink composition of claim 1, wherein said at least one acetylenic alcohol comprises at least one acetylenic alcohol selected from the group consisting of propargyl alcohol, methyl butynol, 3,5-dimethyl-1-hexyne-3-ol, and 1-hexyne-3-ol.

8. The inkjet ink composition of claim 1, wherein said at least one acetylenic alcohol comprises from about 500 ppm to about 0.5% total weight of said ink composition.

9. The inkjet ink composition of claim 1 wherein said at least one acetylenic alcohol comprises at least one acetylenic alcohol selected from the group consisting of propargyl alcohol, methyl butynol, 3,5-dimethyl-1-hexyne-3-ol, and 1-hexyne-3-ol.

10. A method for reducing corrosiveness of an inkjet ink composition comprising adding to said inkjet ink composition a sufficient quantity of at least one acetylenic alcohol that contains a terminal acetylene and an α-hydroxy group to reduce the corrosiveness of said ink composition to metal placed in contact with said ink composition.

11. The method of claim 10, further comprising adding to said inkjet ink an additive selected from the group consisting of amines, potassium iodide, and sulfonic acid.

12. The method of claim 10 wherein adding a sufficient quantity of at least one acetylenic alcohol comprises adding at least one acetylenic alcohol selected from the group consisting of propargyl alcohol, methyl butynol, 3,5-dimethyl-1-hexyne-3-ol, and 1-hexyne-3-ol.

13. The method of claim 10 wherein adding a sufficient quantity of at least one acetylenic alcohol comprises adding from about 500 ppm to about 0.5% of at least one acetylenic alcohol based on the total weight of said ink composition.

* * * * *